United States Patent
Kang et al.

(10) Patent No.: US 8,419,389 B2
(45) Date of Patent: Apr. 16, 2013

(54) RECIPROCATING COMPRESSOR

(75) Inventors: Yang-Jun Kang, Changwon-shi (KR); Young-Hoan Jeon, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 12/739,074

(22) PCT Filed: Oct. 10, 2008

(86) PCT No.: PCT/KR2008/005991
§ 371 (c)(1),
(2), (4) Date: Nov. 19, 2010

(87) PCT Pub. No.: WO2009/054633
PCT Pub. Date: Apr. 30, 2009

(65) Prior Publication Data
US 2011/0064593 A1 Mar. 17, 2011

(30) Foreign Application Priority Data
Oct. 24, 2007 (KR) .................. 10-2007-0107387

(51) Int. Cl.
*F04B 17/03* (2006.01)
*H02K 41/02* (2006.01)

(52) U.S. Cl.
USPC ........................... 417/417; 310/12.01

(58) Field of Classification Search .......... 417/45, 417/415, 416, 417, 418, 481; 310/12.01, 310/12.15, 12.17, 15, 36
See application file for complete search history.

(56) References Cited

U.S. PATENT DOCUMENTS

| 6,917,127 | B2 * | 7/2005 | Hong et al. | 310/14 |
| 7,075,199 | B2 * | 7/2006 | Kang et al. | 310/15 |
| 7,449,804 | B2 * | 11/2008 | Yoon et al. | 310/15 |
| 7,591,638 | B2 * | 9/2009 | Lee et al. | 417/415 |
| 7,649,285 | B2 * | 1/2010 | Ueda | 310/12.01 |
| 2002/0105247 | A1 * | 8/2002 | Park | 310/254 |
| 2004/0245863 | A1 | 12/2004 | Hong et al. | |
| 2006/0261681 | A1 * | 11/2006 | Choi et al. | 310/15 |
| 2009/0232666 | A1 * | 9/2009 | Choi et al. | 417/212 |

FOREIGN PATENT DOCUMENTS

| EP | 1 724 907 | 11/2006 |
| KR | 10-2004-0090821 | 10/2004 |
| KR | 10-2007-0075891 | 7/2007 |

OTHER PUBLICATIONS

International Search Report issued in PCT/KR2008/005991 dated Mar. 23, 2010.

* cited by examiner

*Primary Examiner* — Devon Kramer
*Assistant Examiner* — Bryan Lettman
(74) *Attorney, Agent, or Firm* — Ked & Associates LLP

(57) ABSTRACT

A reciprocating compressor in which a piston is linearly reciprocated inside a cylinder, for sucking a refrigerant into a compression space, and compressing and discharging the refrigerant. More particularly, a reciprocating compressor which can reduce the number of inverter switches required to apply power to a motor (coil section). The reciprocating compressor having a stationary member and a movable member connected by a plate spring, and having an outer stator consisting of blocks encompassing an inner stator, wherein a length of a lower pole of each block is varied.

11 Claims, 5 Drawing Sheets

RECIPROCATING COMPRESSOR

TECHNICAL FIELD

The present invention relates to a reciprocating compressor in which a piston is linearly reciprocated inside a cylinder, for sucking a refrigerant into a compression space, and compressing and discharging the refrigerant, and more particularly, to a reciprocating compressor which can reduce the number of inverter switch required to apply power to a motor (coil section) to one by connecting a stationary member and a movable member by a plate spring, having an outer stator consist of blocks encompassing an inner stator, and varying the length of the lower pole of each block.

BACKGROUND ART

In general, a compressor is a mechanical apparatus for compressing the air, refrigerant or other various operation gases and raising a pressure thereof, by receiving power from a power generation apparatus such as an electric motor or turbine. The compressor has been widely used for an electric home appliance such as a refrigerator and an air conditioner, or in the whole industry.

The compressors are roughly classified into a reciprocating compressor in which a compression space for sucking or discharging an operation gas is formed between a piston and a cylinder, and the piston is linearly reciprocated inside the cylinder, for compressing a refrigerant, a rotary compressor in which a compression space for sucking or discharging an operation gas is formed between an eccentrically-rotated roller and a cylinder, and the roller is eccentrically rotated along the inner wall of the cylinder, for compressing a refrigerant, and a scroll compressor in which a compression space for sucking or discharging an operation gas is formed between an orbiting scroll and a fixed scroll, and the orbiting scroll is rotated along the fixed scroll, for compressing a refrigerant.

Recently, a linear compressor which can improve compression efficiency and simplify the whole structure without a mechanical loss resulting from motion conversion by connecting a piston directly to a linearly-reciprocated driving motor has been popularly developed among the reciprocating compressors.

FIG. 1 is a view for conceptually explaining a conventional reciprocating compressor. A cylinder 4 required for compression and expansion and a piston 6 provided inside the cylinder and capable of reciprocating are included. The cylinder 4 includes a discharge valve 24 which is opened and closed according to a pressure of a compression space in the cylinder 4. The reciprocating compressor includes a motor 10 for providing power required for compression. The motor comprises an inner stator 12 formed by laminating a plurality of laminations in the circumferential direction, and installed outside the cylinder 4, an outer stator 14 having a coil winding body 14a formed therein, and installed outside the cylinder 4 with a predetermined gap from the inner stator 12, and a permanent magnet 16 positioned at the gap between the inner stator 12 and the outer stator 14, and connected to the piston 6. A back cover 2 connected to one surface of the piston 6 and the cylinder 4 is connected by a spring 5, preferably, a coil spring.

In the reciprocating motor 10, when a current is applied to the coil winding body 14a to generate an electromagnetic force, the permanent magnet 16 is linearly reciprocated by interactions between the electromagnetic force and the permanent magnet 16, and the piston 6 connected to the permanent magnet 16 is linearly reciprocated inside the cylinder 4.

FIG. 2 is a view illustrating a circuit diagram for applying power to the motor of the conventional reciprocating compressor. There is included a DC power supply unit 22 for rectifying an AC power (not shown) for home use or industrial use and converting it into a DC, which is controlled by inverter switches S1 to S4. Although a rectifier section for rectifying an AC power and a DC link section for stabilizing the rectified power are included, they are omitted.

The DC power controlled through the rectifier section (not shown) and the DC link section (not shown) is converted into an AC power having an appropriate amplitude and frequency through the inverter switches S1 to S4, and the AC power Vm is applied to the motor (10 of FIG. 1). However, such a power supply apparatus employs no less than four switches, and hence the price is not cheap and the power supply apparatus becomes complicated.

FIG. 3 is a graph showing the operation of the conventional reciprocating compressor and a view showing a modeling of the reciprocating compressor.

When no power is applied to the motor (10 of FIG. 1) and there is no external force applied thereto, the distance between the head of the piston 6 and one surface of the cylinder constituting the compression space (hereinafter, the initial value) is denoted by $X_i$. A point at which the head of the piston 6 is the closest to one surface of the cylinder constituting the compression space is referred to as a top dead center or top dead point, and a point at which the head of the piston 6 is the farthest from one surface of the cylinder constituting the compression space is referred to as a bottom dead center or bottom dead point. The piston 6 is provided inside the cylinder 4 so as to be reciprocatable. The mass of the piston is m, the elastic coefficient of the spring for connecting the piston 6 to the back cover (2 of FIG. 1) connected to the cylinder is k, and a resistant constant is Cf. $\Delta P$ is the difference between a discharge pressure and suction pressure in the cooling cycle of a cooling apparatus. $\Delta P \cdot As$ is a force shifting the piston 6 due to the difference between the discharge pressure and suction pressure, which can be modeled as a gas spring. For efficiency purpose, the top dead center is preferably one surface of the cylinder 4. That is, it is preferred that $X_i=0$ at the top dead center. When no power is applied to the motor 10 and there is no other external force applied thereto, the piston 6 is located at the middle between the top dead center and the bottom dead center.

The operation for one cycle of the conventional reciprocating compressor is as follows. If it is assumed that the piston 6 starts from C, Xi is the largest and the discharge valve (not shown) is in a closed state. When the piston 6 moves and Xi is decreased, the pressure rises up to a level enough to open the discharge valve (D). When the discharge valve (not shown) is opened, the compressed fluid (refrigerant) is discharged, there is no change in pressure, and one surface of the piston is moved until Xi=0(A). Upon completion of compression to the top dead center, the piston 6 is moved in the opposite direction. If Xi increases, the volume of the compression space becomes larger, and Xi increases to more than a predetermined value, the discharge valve is closed. If the suction process is performed in a state the discharge valve is closed, Xi increases, and thus the pressure decreases and returns to its original position C, thereby completing one cycle.

In such a reciprocating compressor, the power supply unit (power supply apparatus) for supplying power to the motor employs no less than four switches, and hence the price is not cheap and the power supply apparatus is complicated and not easy to control.

DISCLOSURE OF INVENTION

Technical Problem

Accordingly, it is an object of the present invention to provide a reciprocating compressor which is easy to control and low in manufacturing cost by having a power supply apparatus with a reduced number of switches of an inverter switch unit.

It is another object of the present invention to provide a reciprocating compressor in which a stationary member and a movable member are connected by a plate spring so as to enable control through one inverter switch, an outer stator of a motor comprises respective blocks, and the length of the upper poles of the blocks is different.

Technical Solution

A reciprocating compressor according to the present invention comprises: a movable member including a piston; a cylinder; a stationary member provided in the cylinder and including a motor for reciprocating the piston; one or a plurality of spring providing a motive power to drive the movable member to the bottom dead center from the top dead center, one part of which being fixed to the movable member and the other part of which being fixed to the stationary member; and a shell encompassing the movable member, stationary member, and springs, the motor comprising: an inner stator formed by insulatingly stacking core blocks in the circumferential direction; an outer stator having a coil winding body, and consisting of a plurality of blocks encompassing the inner stator at a predetermined interval, each block comprising a coil formed in the circumferential direction and an upper pole and a lower pole spaced apart by a pole tip; and the lengths of the upper pole and lower pole of each adjacent block not being the same; and one or a plurality of permanent magnets maintaining a gap between the inner stator and the outer stator, and linearly reciprocating by a mutual electromagnetic force.

Preferably, the length of the upper poles of the blocks facing each other in the motor is constant.

Preferably, the length of the pole tip of each block is all the same.

Preferably, the length of the upper pole of each block takes a sine function form as the central angle changes.

Preferably, the reciprocating compressor further comprises a control unit for controlling inverter switches for applying a voltage to the motor.

Preferably, the piston is located at the bottom dead center in an initial state of the compressor.

Preferably, when the movable member is driven from the top dead center to the bottom dead center, the control unit drives the movable member by a spring without applying power to the motor.

Preferably, when the movable member is driven from the bottom dead center to the top dead center, the control unit drives the movable member by the motor by applying power to the motor.

ADVANTAGEOUS EFFECTS

Consequently, the present invention can provide a reciprocating compressor which is easy to control and low in manufacturing cost by having a power supply apparatus with a reduced number of switches of an inverter switch unit.

Additionally, the present invention can allow the movable member to perform a stable linear reciprocating movement by connecting a stationary member and the movable member by a plate spring so as to enable control through one inverter switch, having the outer stator of the motor consist of respective blocks, and varying the length of the upper poles of the adjacent blocks.

MODE FOR THE INVENTION

Hereinafter, the present invention will be described in detail with reference to the embodiments of the present invention and the attached drawings.

Figure 4:
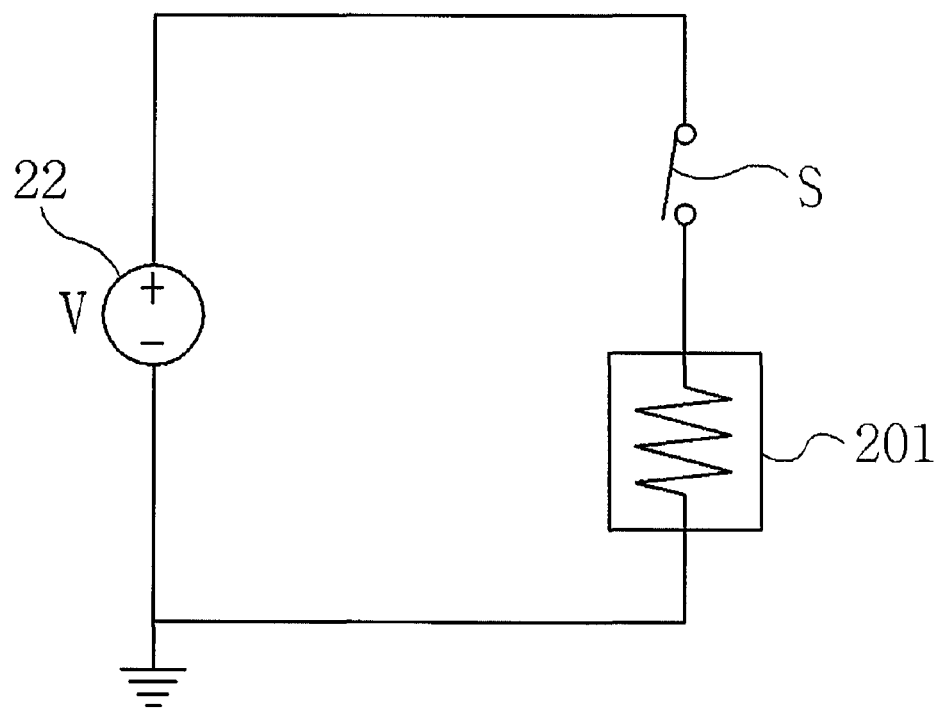
FIG. 4 is a view illustrating a circuit diagram for applying power to the motor of a reciprocating compressor according to the present invention.

FIG. 4 is a view illustrating a circuit diagram for applying power to the motor of a reciprocating compressor according to the present invention. There is included a DC power supply unit 22 for rectifying an AC power (not shown) for home use or industrial use and converting it into a DC, which is controlled by inverter switches S. A control unit (not shown) controls an AC power (not shown) for home use or industrial use to be an AC power required by the reciprocating compressor. The controlled power is supplied to a motor 201. In the case that power is applied to the motor in the thusly-configured circuit diagram, the number of inverter switches is decreased, thereby making control easier and making the manufacturing cost cheaper.

Figure 3:
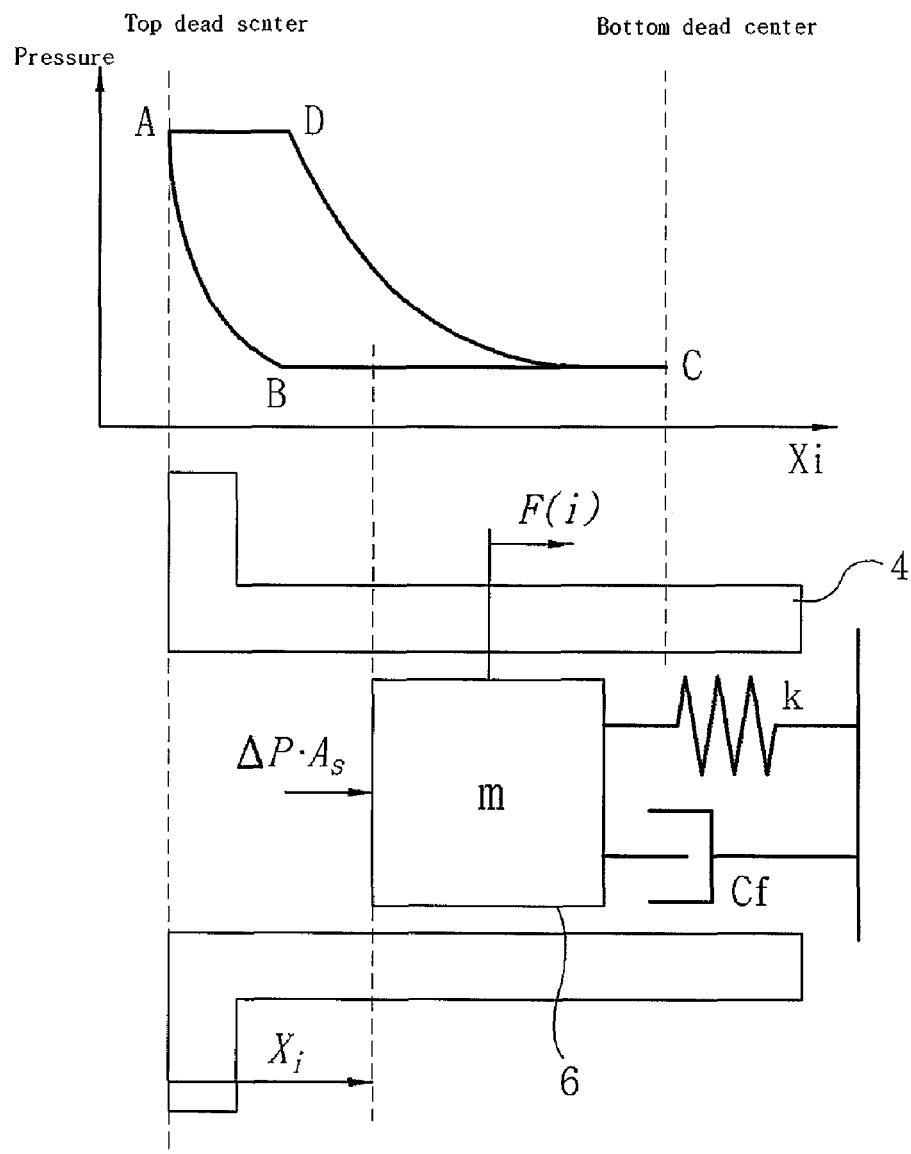
FIG. 3 is a graph showing the operation of the conventional reciprocating compressor and a view showing a modeling of the reciprocating compressor.

In the graph as shown in the upper part of FIG. 3, it can be seen that a task has to be performed on gas from a thermodynamical point of view in the compression step from C to A via D because the volume is decreased due to compression, while gas performs a task on the piston from a thermodynamical point of view in the suction step from A to C via B. Accordingly, the reciprocating compressor according to the present invention moves the piston by supplying power in the compression step, and moves the piston through other motive powers without supplying power in the suction step. Other motive powers will be explained later through the drawing for conceptually explaining a movable member and a driving member.

Figure 5:
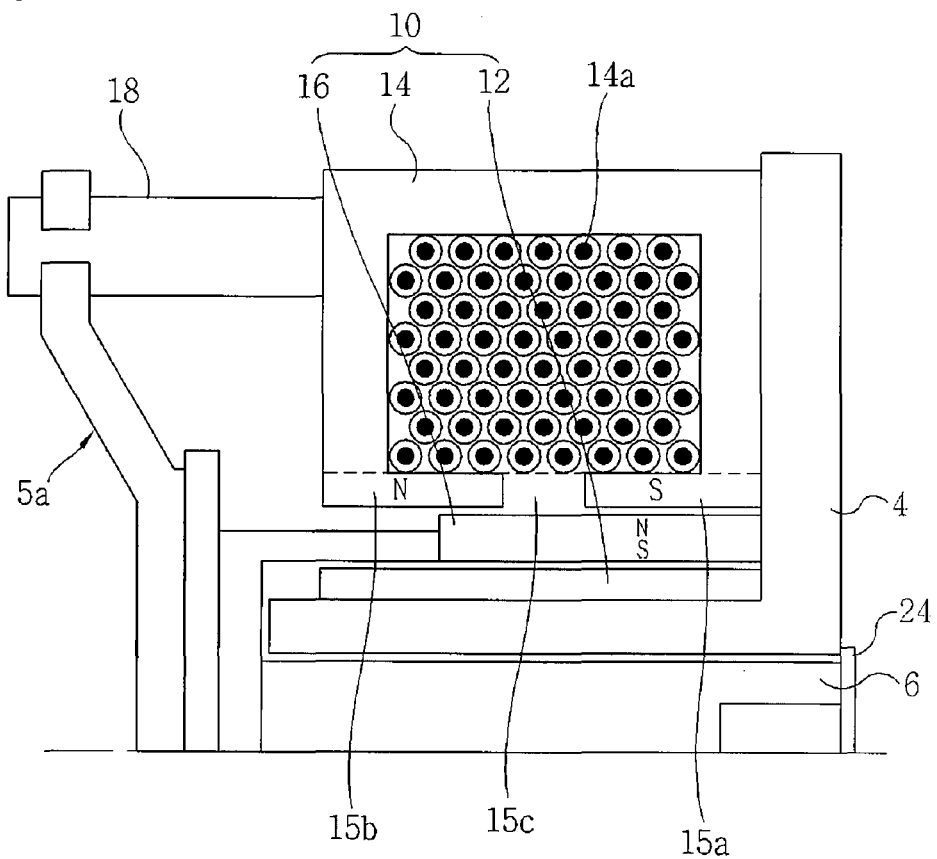
FIG. 5 is a view for conceptually explaining a movable member and a driving member of the reciprocating compressor according to the present invention.

FIG. 5 is a view for conceptually explaining a movable member and a driving member of the reciprocating compressor according to the present invention. The cylinder 4, the piston 6 provided inside the cylinder and capable of reciprocating, and the discharge valve 24 are identical to those in FIG. 1.

In the reciprocating compressor according to the present invention, while the piston 6 is moved through a motive power in the compression step for moving the piston 6 to the top dead center from the bottom dead center, the piston 6 is moved through a restoration force of the spring without driving the motor in the suction step for moving the piston 6 to the bottom dead center from the top dead center. Like in the conventional reciprocating compressor, if the back cover (2 of FIG. 1) and the piston (6 of FIG. 1) are connected by a compression-type coil spring (5 of FIG. 1), no driving force can be obtained when moving the piston to the bottom dead center from the top dead center. Thus, the structure of the spring needs to be changed.

In order to connect the back cover (2 of FIG. 1) and the piston (6 of FIG. 1) by a spring and move the piston without driving the motor in the suction step, a restoration force is required when moving the piston to the bottom dead center from the top dead center. As. such a spring, a tensile spring, a plate spring, and so on can be used. The tensile spring requires a separate device for supporting the tensile spring, and since this makes assembling difficult, a plate spring 5a is used in an example to be described later. However, the plate spring 5a is merely an example, but any springs that generate a restoration force upon moving the piston to the bottom dead center from the top dead center are possible.

In the suction step for moving the piston 6 to the bottom dead center from the top dead center, the piston 6 has to be moved only by a restoration force of the plate spring 5a without driving the motor. Since the piston 6 has to be moved to the bottom dead center from the top dead center only by the restoration force of the plate spring, the piston 6 is designed to be located at the bottom dead center if no power is applied to the motor 10 and there is no other external force applied thereto. For this, one surface of the piston 6 and a support member 18 connected to the motor 10 are connected by a plate spring 5a unlike in FIG. 1, and when the piston 6 moves toward the top dead center, a restoration force toward the bottom dead center is generated by the plate spring 5a.

In the thusly-constructed reciprocating compressor, since the piston 6 is moved only by a restoration force of the plate spring 5a without driving the motor in the suction step for movement from the top dead center to the bottom dead center, if no power is applied to the motor and there is no external force applied thereto (hereinafter, initial state), the piston 6 is positioned at the bottom dead center due to the restoration force of the plate spring 5a.

Figure 1:
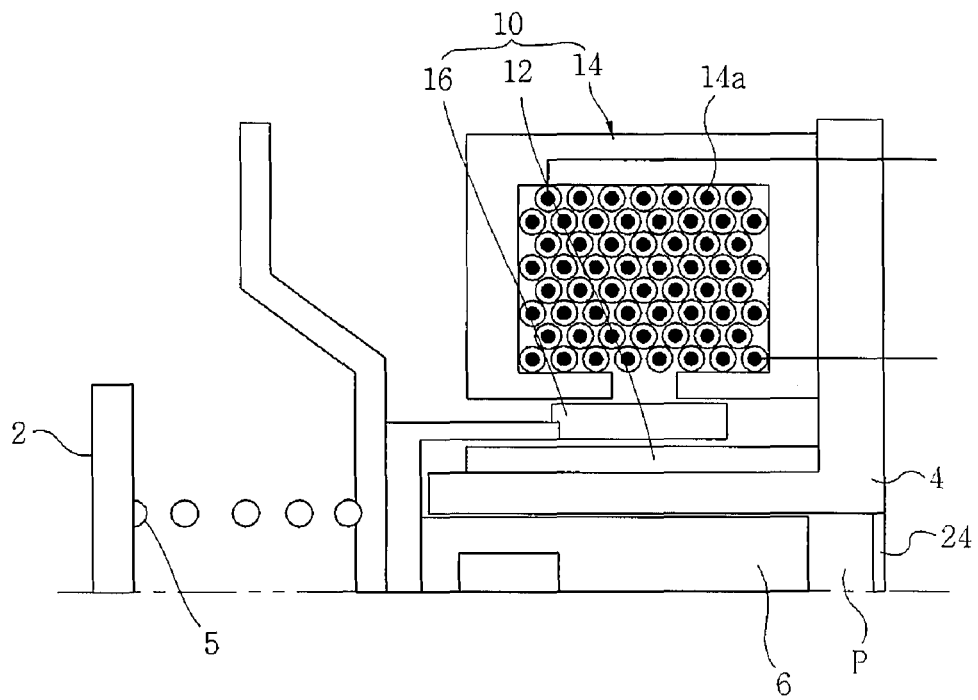
FIG. 1 is a view for conceptually explaining a conventional reciprocating compressor.

In the motor 10, the inner stator 12 and the permanent magnet 16 are identical to those in FIG. 1, but the construction of the outer stator 14 having a coil winding body 14a formed therein is different from that of FIG. 1. The outer stator 14 comprises an upper pole 15a disposed near the top dead center and a lower pole 15b disposed near the bottom dead center, when viewed from the cylinder 4 side. The gap between the upper pole 15a and the lower pole 15b is called a pole tip 15c.

If the lengths of the upper pole 15a, lower pole 15b, and pole tip 15c of the outer stator 14 are all the same, a problem occurs. As the piston 6 arrives at the top dead center from the bottom dead center and returns to the bottom dead center, no power is applied because this is the suction step. However, the magnetic field instantaneously remains, and the center of the permanent magnet 16 is encouraged to move to the center of the upper pole 15a by the remaining magnetic field. Normally, in the reciprocating compressor, the piston comes closer to the top dead center enough to make one surface of the piston 4 contact with the discharge valve 24 for the purpose of efficiency. However, as the permanent magnet 16 is geared to move the center of the upper pole 15a, a collision occurs, and the piston is moved much further to the top dead center than an expected reciprocation distance. For this reason, if the lengths of the upper pole 15a, lower pole 15b, and pole tip 15c are all the same, control cannot be done. To solve this problem, the structure of the outer stator 14 needs to be changed.

Figure 2:
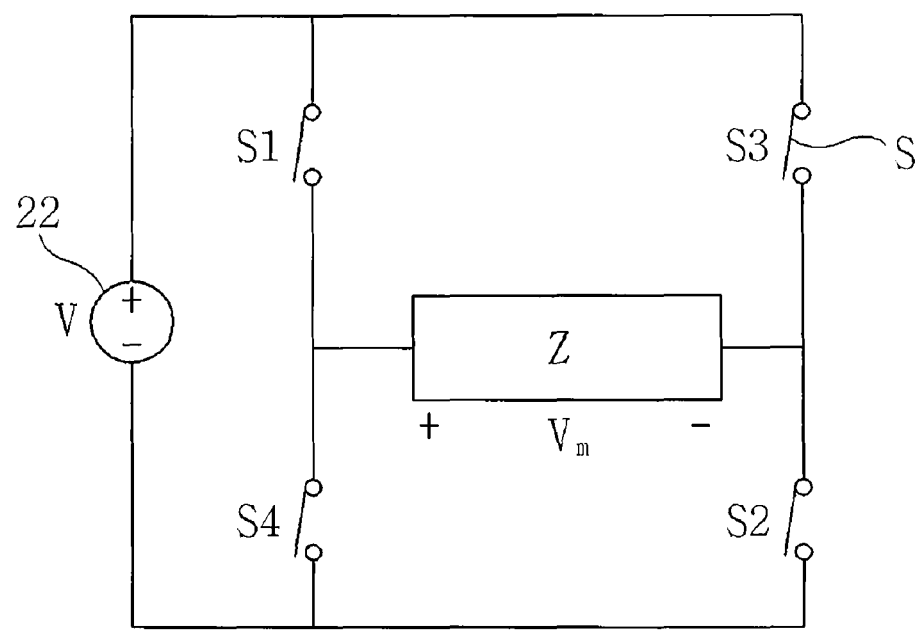
FIG. 2 is a view illustrating a circuit diagram for applying power to the motor of the conventional reciprocating compressor.
Figure 6:
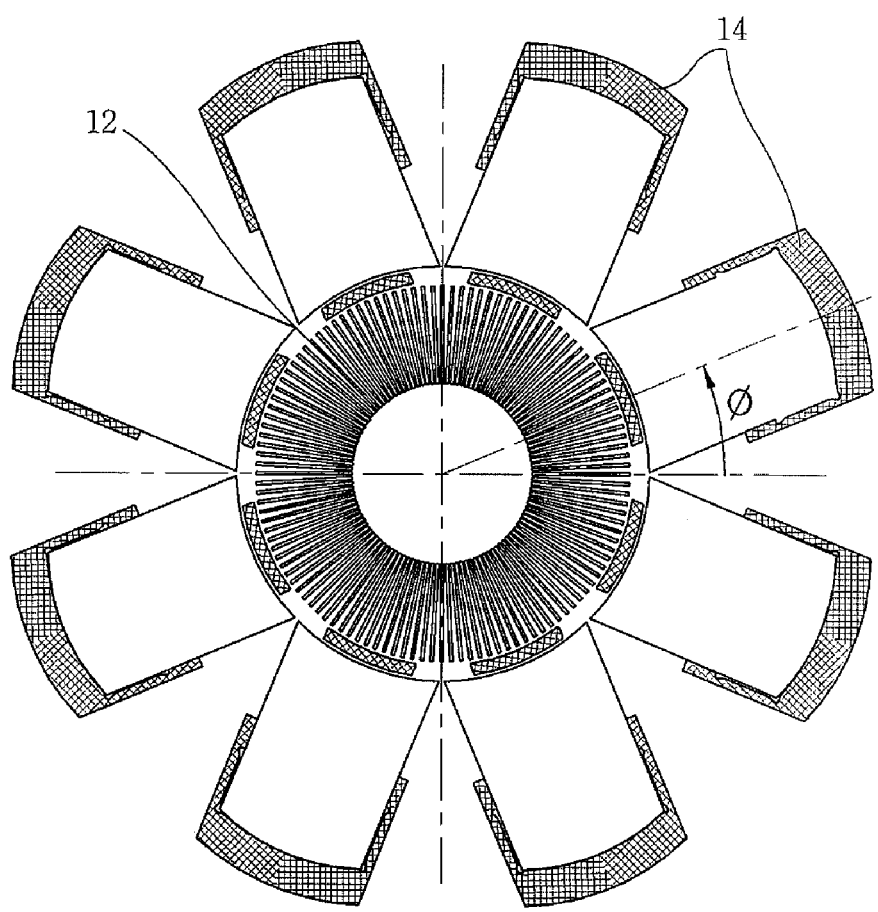
FIG. 6 is a view showing one example of an outer stator and an inner stator of the reciprocating compressor according to the present invention.

FIG. 6 is a view showing one example of an outer stator and an inner stator of the reciprocating compressor according to the present invention. A cylindrical inner stator 12 is disposed in the middle, and an outer stator 14 consisting of eight blocks encompasses the inner stator 12. Each block of the outer stator 14 comprises a coil (not shown). In the reciprocating compressor, a permanent magnet is reciprocatably provided between the inner stator 12 and the outer stator 14. The structure of the outer stator 14 is not formed in a single cylindrical form but in a plurality of blocks. By configuring the outer stator in a plurality of blocks, the aforementioned problem of uncontrollability upon arrival of the piston at the top dead center can be solved by varying the lengths of the upper pole (15a of FIG. 2b), lower pole (15b of FIG. 2b) and pole tip (15c of FIG. 2b) of each block. That is to say, the lengths of the upper pole 15a, lower pole 15b, and pole tip 15c are all the same, this creates a dead zone (where none of the upper pole and lower pole exist). Due to this, if no power is applied upon arrival of the piston at the bottom dead center, the magnetic field instantaneously remains, and the center of the permanent magnet is encouraged to move to the center of the upper pole 15a by the remaining magnetic field, thereby resulting in uncontrollability. If the outer stator is configured like FIG. 6, and the lengths of the upper pole and lower pole of each block are not the same, no dead zone exists, thereby eliminating the phenomenon of uncontrollability.

Figure 7:
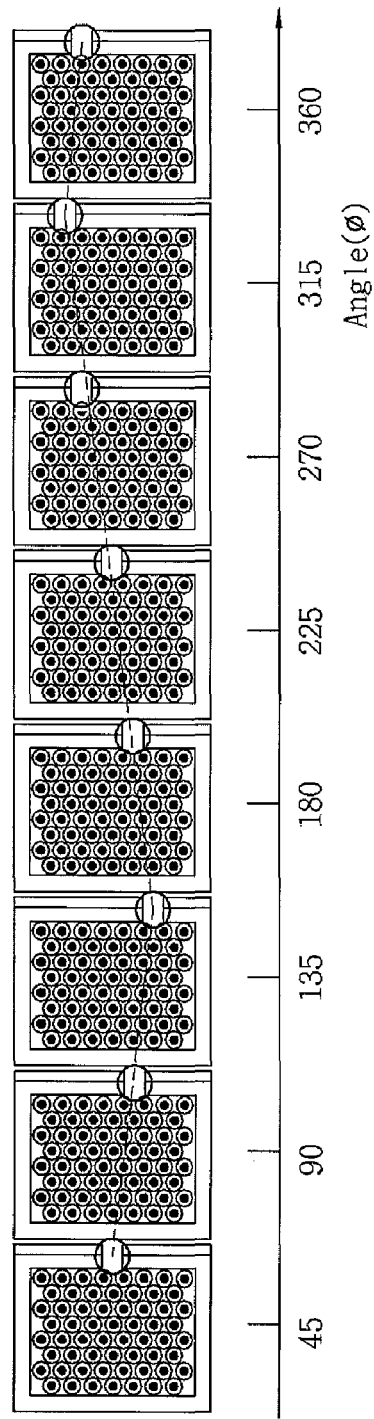
FIG. 7 is a view showing one example of the position of a pole tip in each block of the outer stator.

FIG. 7 is a view showing one example of the position of a pole tip in each block of the outer stator. If it is assumed that the length of the pole tip is the same, the lengths of the upper pole and lower pole are different from each other according to the position of the pole tip. In order to enable control by preventing the generation of a dead zone, the lengths of the upper pole and lower pole of at least the adjacent blocks should be different from each other.

In the illustrated graph, in the outer stator consisting of eight blocks as shown in FIG. 6, each of the blocks is installed at an interval of 45°, and the position of the pole tip takes a sine function form with respect to a certain reference as the central angle changes as shown in FIG. 7. In a motor having such an outer stator, the sum of the lengths of the upper poles of the blocks facing each other in the motor is constant. To eliminate a dead zone, if the position of the pole tip of each of the blocks constituting the outer stator is made not to be the same, control is made possible but the magnetic flux is not symmetrical due to variations of the position of the pole tip, thereby resulting in efficiency deterioration. To prevent efficiency deterioration due to asymmetricity of the magnetic flux, the blocks are configured so that the position of the pole tip takes a sine wave with respect to a certain position.

However, it is recognized that the scope of the present invention should not be limited to these embodiments and drawings but to the claims as hereinafter recited.

The invention claimed is:
1. A reciprocating compressor, comprising;
a movable member including a piston;
a cylinder;
a stationary member provided in the cylinder and including a motor for reciprocating the piston;
one or a plurality of springs providing a motive power to drive the movable member to a bottom dead center from a top dead center, one part of which being fixed to the movable member and the other part of which being fixed to the stationary member; and a shell encompassing the movable member, stationary member, and springs, the motor comprising:
- an inner stator formed by insulatingly stacking core blocks in a circumferential direction;
- an outer stator having a coil winding body, and consisting of a plurality of blocks encompassing the inner stator at a predetermined interval, each block comprising a coil formed in the circumferential direction and an upper pole and a lower pole spaced apart by a pole tip; and
- lengths of the upper pole and lower pole of each adjacent block not being the same; and one or a plurality of permanent magnets maintaining a gap between the inner stator and the outer stator, and linearly reciprocating by a mutual electromagnetic force.

2. The reciprocating compressor of claim 1, wherein a sum of the lengths of the upper poles or the lower poles of the blocks facing each other in the motor is constant.

3. The reciprocating compressor of claim 1, wherein a length of the pole tip of each block is the same.

4. The reciprocating compressor of claim 1, wherein the upper pole or lower pole of each block of the motor has a length corresponding to a sine function formed as a central angle of the outer stator changes.

5. The reciprocating compressor of claim 1, wherein a position of each adjacent pole tip of each block of the motor is different.

6. The reciprocating compressor of claim 1, wherein a position of the pole tip of each block of the motor takes a sine function form as a central angle of the outer stator changes.

7. The reciprocating compressor of claim 1, further comprising a control unit for controlling inverter switches for applying a voltage to the motor.

8. The reciprocating compressor of claim 1, wherein the piston is located at the bottom dead center in an initial state of the compressor.

9. The reciprocating compressor of claim 8, wherein when the movable member is driven from the top dead center to the bottom dead center, the movable member is moved by a spring.

10. The reciprocating compressor of claim 9, wherein the spring is a plate spring.

11. The reciprocating compressor of claim 8, wherein when the movable member is driven from the bottom dead center to the top dead center, a control unit drives the movable member by applying power to the motor.

* * * * *